United States Patent [19]

Schones et al.

[11] Patent Number: 5,297,413

[45] Date of Patent: Mar. 29, 1994

[54] LOAD ADJUSTING MACHINE FOR MAGNETIC DISK DRIVE HEAD GIMBAL ASSEMBLIES

[75] Inventors: Thomas A. Schones; Peter Torresani, both of Hutchinson, Minn.

[73] Assignee: Hutchinson Technology Incorporated, Hutchinson, Minn.

[21] Appl. No.: 13,580

[22] Filed: Feb. 4, 1993

[51] Int. Cl.$^5$ .............................................. B21D 11/10
[52] U.S. Cl. ...................................... 72/342.1; 72/30; 29/173
[58] Field of Search ...................... 29/173; 72/7, 8, 30, 72/33, 34, 31, 342.1, 364, 379.2

[56] References Cited

U.S. PATENT DOCUMENTS 4,167,765 9/1979 Watrous .
4,603,567 8/1986 Smith et al. .

Primary Examiner—Lowell A. Larson
Attorney, Agent, or Firm—Faegre & Benson

[57] ABSTRACT

A computer controlled regram machine for adjusting the loads on head gimbal assemblies to bring the loads within a desired specification window defined by upper and lower window specifications. The regram machine includes a load cell for measuring actual gimbal assembly loads, a mechanical bending mechanism for implementing mechanical adjust procedures to increase and decrease the gimbal assembly loads, and a heat source for implementing light adjust procedures to decrease the gimbal assembly loads. The algorithm executed by the machine includes:

(a) initiating mechanical adjust procedures in an attempt to increase the gimbal assembly loads to a bend load target if the measured loads are below the specification window, the bend load target being a load greater than the upper window specification and an optimum load from which to initiate light adjust procedures;

(b) initiating mechanical adjust procedures in an attempt to decrease the gimbal assembly loads to the bend load target if the measured loads are greater than a light adjust threshold, the light adjust threshold being a load greater than the bend load target and characterizing the upper limit of load changes that are to be implemented by light adjust procedures;

(c) initiating light adjust procedures in an attempt to decrease the gimbal assembly loads to the specification window if the measured loads are above the specification window but less than or equal to the light adjust threshold; and (d) repeating steps (a)-(c) until the measured loads of the gimbal assemblies are within the specification window.

21 Claims, 8 Drawing Sheets

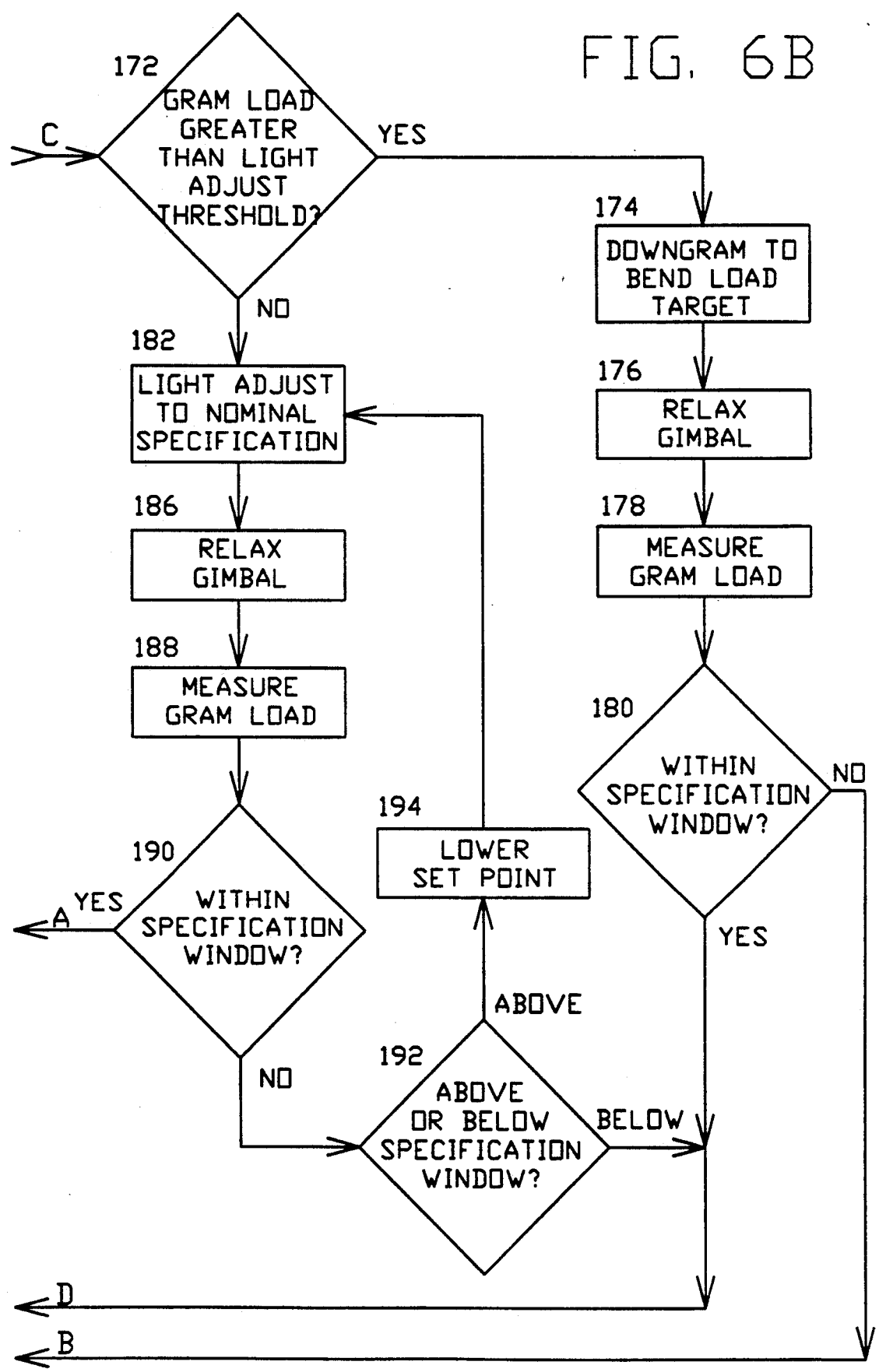

LOAD ADJUSTING MACHINE FOR MAGNETIC DISK DRIVE HEAD GIMBAL ASSEMBLIES

BACKGROUND OF THE INVENTION

The present invention relates generally to machines for measuring and adjusting small force loads. In particular, the present invention is a machine for adjusting the gram load on head gimbal assemblies and/or suspension assemblies used in magnetic disk drives, by bending or otherwise changing the characteristics of the load beam spring.

Head gimbal assemblies are commonly used in magnetic disk drives to support magnetic heads in close proximity to moving disk surfaces. Assemblies of this type are disclosed generally in the Watrous U.S. Pat. No. 4,167,765, and typically include an air bearing head slider assembly mounted to a suspension assembly. The suspension assembly includes a base plate configured to be mounted to a positioning arm, a load beam, and a T-flexure or gimbal. The load beam is an elongated, triangularly shaped member which extends from the base plate. The gimbal is located at the load beam apex. The air bearing head slider assembly contains a magnetic head and is mounted to the gimbal. The load beam is typically manufactured by chemically etching a thin sheet of stainless steel, and mechanically forming flanges and lead clamps on the sides of the blank between the base and apex. The gimbal is also etched from stainless steel, either integrally from the apex of the load beam, or from a separate member which is welded to the load beam. During subsequent manufacturing operations the slider assembly is mounted to the gimbal and the wire leads from the magnetic head clamped to one of the load beam flanges.

High performance disk drive operation requires the air bearing head slider assembly to closely follow the moving magnetic disk surface at a constant spacing and attitude. To meet this critical requirement, the gram loading force applied to the slider assembly by the suspension assembly or load beam must be within a relatively tight specification window. In one disk drive, for example, the specification window is 7.50-7.90 grams (i.e., the upper and lower window specifications), with 7.70 grams being nominal. The gram load of the load beam is therefore adjusted after the suspension assembly is manufactured, and before the gimbal and/or head slider assembly are mounted thereto.

The assignee of the present invention has for a number of years used what is known as a "light adjust" method to adjust the gram load of load beams following their manufacture. A known property of stainless steel members such as the load beams is that the force they exert in response to attempts to bend them can be reduced (stress relieved) through exposure to thermal energy. The functional relationship between the amount of force reduction and the amount of heat to which a member is exposed can be empirically determined. The light adjust method makes use of this empirically determined relationship to "downgram" or lower the gram load on load beams that have been purposely manufactured to have an initial gram load greater than the desired specification window. Downgramming by means of the light adjust method has been found to accurately produce load beams having stable loads.

The light adjust method uses a load cell to measure the gram load of a load beam clamped to a test fixture. A computer controlled actuator moves the load cell with respect to the load beam. As the load cell measuring arm is engaged by the load beam, the computer monitors the measured gram load as a function of time. In practice, the measured gram load quickly slews (i.e., rises) toward its current actual value. When the measured gram load reaches the upper window specification, the computer actuates or turns on a high intensity lamp to apply heat to the load beam. Since the applied heat reduces the actual gram load of the beam, the measured gram load quickly peaks at a point above the upper window specification. Continued application of heat causes the measured gram load to decrease with time. The computer deactuates or turns off the lamp when the measured gram load has decreased to a predetermined set point, typically a load between the nominal gram load and the lower window specification. Once the lamp has been turned off, the measured decrease in gram load quickly slows and reaches its minimum value (often at a gram load below the lower window specification) as the heat in the load beam dissipates. However, as the load beam continues to cool, the measured gram load increases and stabilizes at an equilibrium or final load value that is preferably well within the specification window, and ideally close to the nominal specification. The final gram load of the load beam is also measured following the light adjust procedure. This measurement is used by the computer to continually update the stored model (e.g., the setpoint) of the functional relationship between the amount of heat applied and the gram load reduction to optimize the accuracy of the results obtained by the light adjust procedure.

The assignee of the present invention also uses a computer controlled mechanical bending method to adjust the gram load on load beams. The mechanical bending method makes use of an empirically determined relationship between the amount that a load beam is mechanically bent and the associated change in gram load. For the range of gram load adjustments that are typically performed by this technique, a simple linear regression line has been found to accurately describe this relationship. In practice, this technique is implemented by a computer coupled to a stepper motordriven bending member and a load cell. A model of the relationship between changes in gram load and the number of motor steps (i.e., the associated amount or extent of bending required) is stored in the computer. After the actual load on the load beam is measured by the load cell, the computer calculates the required load correction (i.e., the difference between the measured and desired loads). The computer then accesses the model as a function of the required correction to determine the number of motor steps needed to achieve the required load correction, and actuates the stepper motor accordingly. Once the load beam has been bent, the actual load is again measured and used to update the model. Measured data from a given number of the most recently executed mechanical bends is used to recompute the regression line data prior to the execution of the next mechanical bend. Although this bending technique can be used to both increase and decrease gram loads, it does not offer sufficient long term stability.

The air bearing head slider assemblies are mounted to the gimbal, and the head leads clamped to the load beam, after the gram load of the load beam has been initially set using methods such as those described above. Unfortunately, the mechanical handling and assembly procedures involved in this manufacturing operation sometimes force the gram loads of the assembled head gimbal assemblies beyond the specification window. Since the gram load specification is so critical to proper disk drive operation, these out-of-specification head gimbal assemblies cannot be used.

Head gimbal assembly manufacturing is by nature a high volume, low margin business. To date, it has not been commercially feasible to "regram" (i.e., readjust the gram load) of out-of-specification head gimbal assemblies by means of the techniques described above. Nonetheless, the waste associated with the unusable out-of-specification assemblies is relatively great. With the development of higher performance disk drives requiring head gimbal assemblies with even tighter load window specifications, it is likely that the number of out-of-specification assemblies, and therefore the waste, will continue to rise.

A microprocessor controlled manufacturing system for load support arms is disclosed in the Smith Et. al. U.S. Pat. No. 4,063,567. This system includes a waling beam transport system for moving load beams extending from frets between several stations. A radius forming station mechanically bends the load support arms to increase gram loads. A thermal adjust station is operated in a manner similar to the light adjust method described above to reduce gram loads. The load beams are cut from the fret at a shear station after they have been processed at the radius forming and thermal adjust stations. This manufacturing system is not, however, adapted for readjusting gram loads after the load beams have been assembled into gimbal assemblies. The system is also relatively complicated.

It is evident that there is a need for a machine capable of economically readjusting the gram loads on suspension assemblies and head gimbal assemblies. The machine must of course be capable of accurately adjusting the gram loads. To be commercially viable, the machine must also be relatively easy to operate and capable of quickly performing the regram operations.

SUMMARY OF THE INVENTION

The present invention is a machine capable of quickly and accurately adjusting loads on head gimbal assemblies and/or suspension assemblies so as to bring the loads within a desired specification window defined by upper and lower window specifications. The load adjusting machine includes a load cell, a mechanical bending mechanism and a heat source, all of which are coupled to and controlled by a computer. The load cell measures and provides load signals representative of actual suspension assembly loads. The mechanical bending mechanism is responsive to mechanical adjust control signals and bends the suspension assembly load beams to increase and decrease loads. The heat source is responsive to heat adjust control signals and applies heat to the load beam to decrease loads. The computer includes a digital processor and memory for storing mechanical adjust data, heat adjust data and control data. The mechanical adjust data characterizes the relationship between the mechanical adjust control signals and load changes to be made by the mechanical bending mechanism. The heat adjust data characterizes the relationship between the heat adjust control signals and load decreases to be made by the heat source. Control data stored in the memory includes data representative of the upper and lower window specifications and a light adjust threshold. The light adjust threshold is a load greater than the upper window specification, and represents the upper limit of the load range for which light adjust procedures will be performed. The algorithm executed by the digital processor to adjust suspension assembly loads includes:

(a) receiving load signals representative of measured suspension assembly gimbal loads;

(b) accessing the memory and generating mechanical adjust control signals as a function of the load signals, to actuate the mechanical bending mechanism and attempt to upload the suspension assemblies to a load greater than the upper window specification if the measured load is less than the lower window specification;

(c) accessing the memory and generating mechanical adjust control signals as a function of the load signals, to actuate the mechanical bending mechanism and attempt to download the suspension assemblies to a load less than or equal to the light adjust threshold and greater than the upper window specification if the measured load is greater than the light adjust threshold;

(d) accessing the memory and generating heat adjust control signals as a function of the load signals, to actuate the heat source and attempt to download the suspension assemblies to a load less than or equal to the upper window specification and greater than or equal to the lower window specification if the measured load is greater than the upper window specification and less than or equal to the light adjust threshold; and (e) repeating steps (a)–(d) until the measured suspension assembly load is within the specification window.

In another embodiment of the load adjusting machine, the memory includes control data representative of a bend load target. The bend load target is a load greater than the upper window specification but less than the light adjust threshold, and is the preferred load from which to initiate a light adjust procedure. Steps (b) and (c) of the algorithm executed by the processor in this embodiment include:

(b) accessing the memory and generating mechanical adjust control signals as a function of the load signals, to actuate the mechanical bending mechanism and attempt to upload the suspension assembly to a load equal to the bend load target if the measured load is less than the lower window specification; and (c) accessing the memory and generating mechanical adjust control signals as a function of the load signals, to actuate the mechanical bending mechanism and attempt to download the suspension assembly to a load equal to the bend load target if the measured load is greater than the light adjust threshold.

In yet another embodiment, the algorithm executed by the processor further includes:

(f) accessing the memory and generating mechanical adjust control signals as a function of the load signals, to actuate the mechanical bending mechanism and attempt to upload the suspension assembly to the bend load target if the measured load is within the specification window after steps (b) or (c) of the algorithm are executed; and (g) repeating steps (a)–(d) and (f) until the measured load of the suspension assembly is within the specification window.

In still another embodiment, the heat adjust data stored in the memory includes data representative of a set point load. Step (d) of the algorithm executed by the processor in this embodiment (d₁) receiving load signals representative of the suspension assembly load;

(d₂) monitoring increasing suspension assembly load as the suspension assemblies are engaged with the load cell;

(d₃) actuating the heat source when the measured suspension assembly load reaches the upper window specification; and (d₄) deactuating the heat source when the measured suspension assembly load decreases to the set point load.

In another embodiment the mechanical bending mechanism includes a stepper motor-actuated bending member, and the stored mechanical adjust data includes data representative of load changes as a function of motor steps. Steps (b) and (c) of the algorithm implemented by the processor include accessing the memory as a function of the desired load changes and generating the mechanical adjust control signals as a function of the associated number of motor steps.

DETAILED DESCRIPTION OF THE PREFERRED EMBODIMENTS

Figure 1:
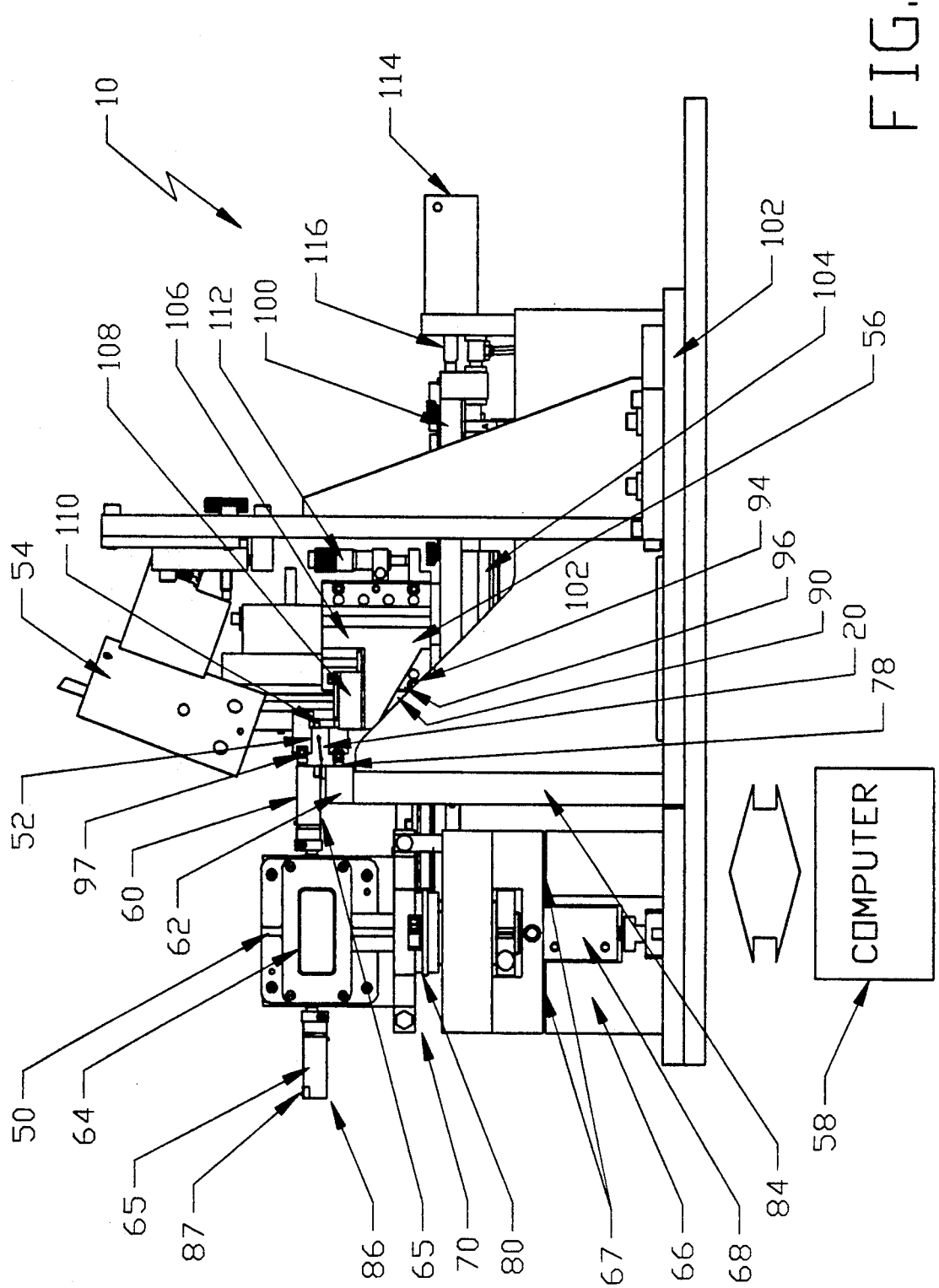
FIG. 1 is a side view of a gimbal assembly load adjusting machine in accordance with the present invention.
Figure 2:
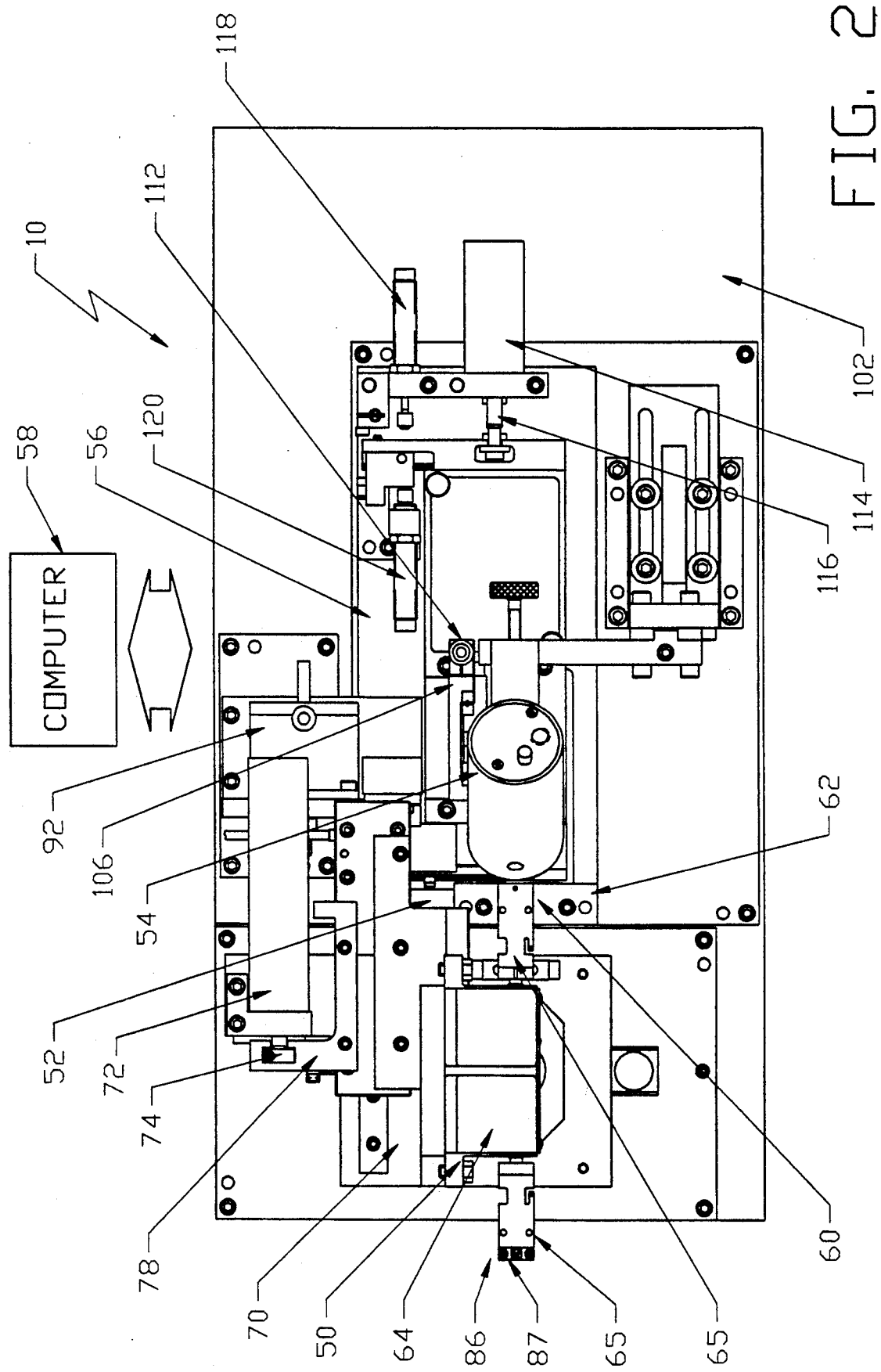
FIG. 2 is a top view of the gimbal assembly load adjusting machine shown in FIG. 1.
Figure 3:
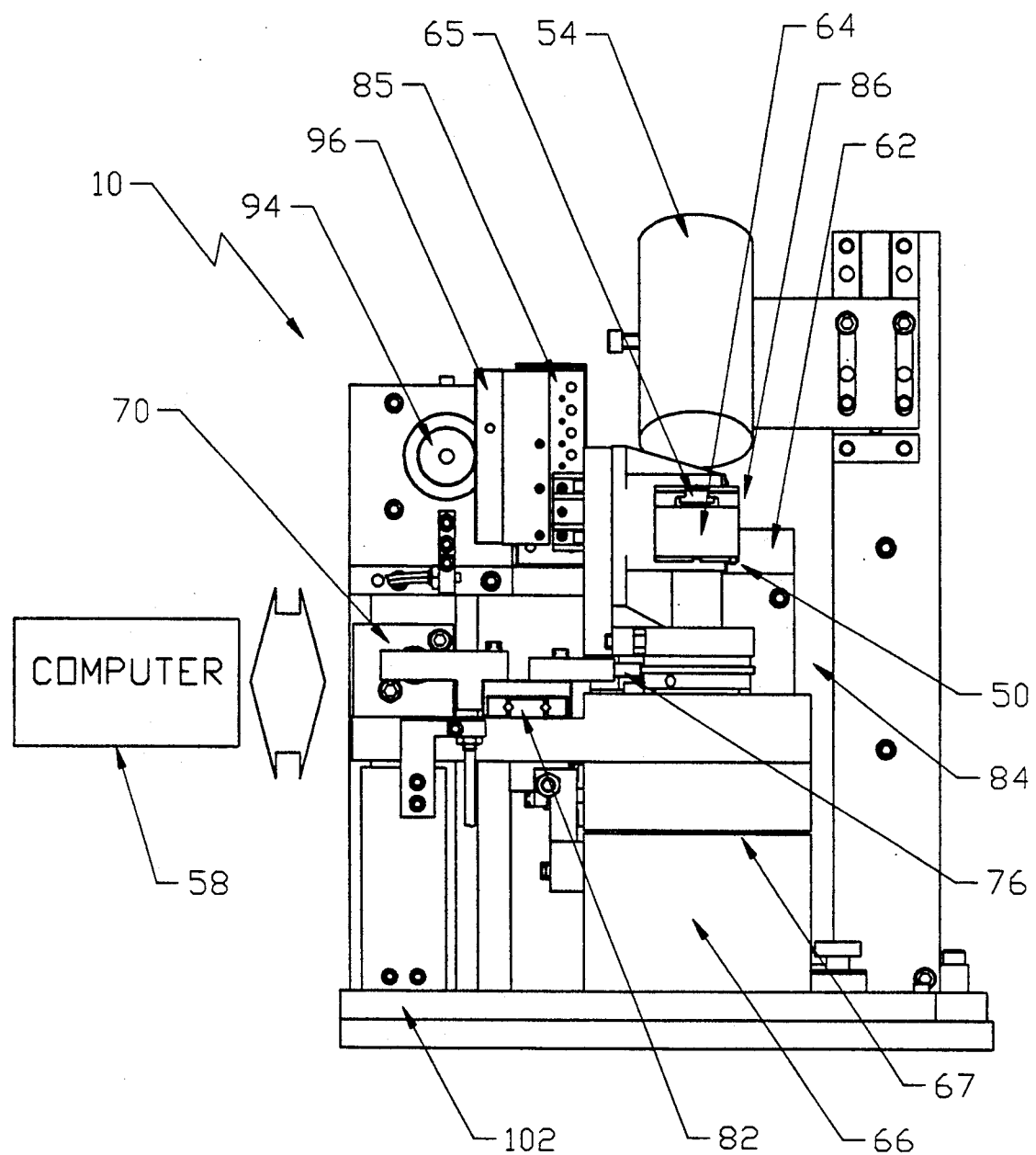
FIG. 3 is a front view of the gimbal assembly load adjusting machine shown in FIG. 1.
Figure 4:
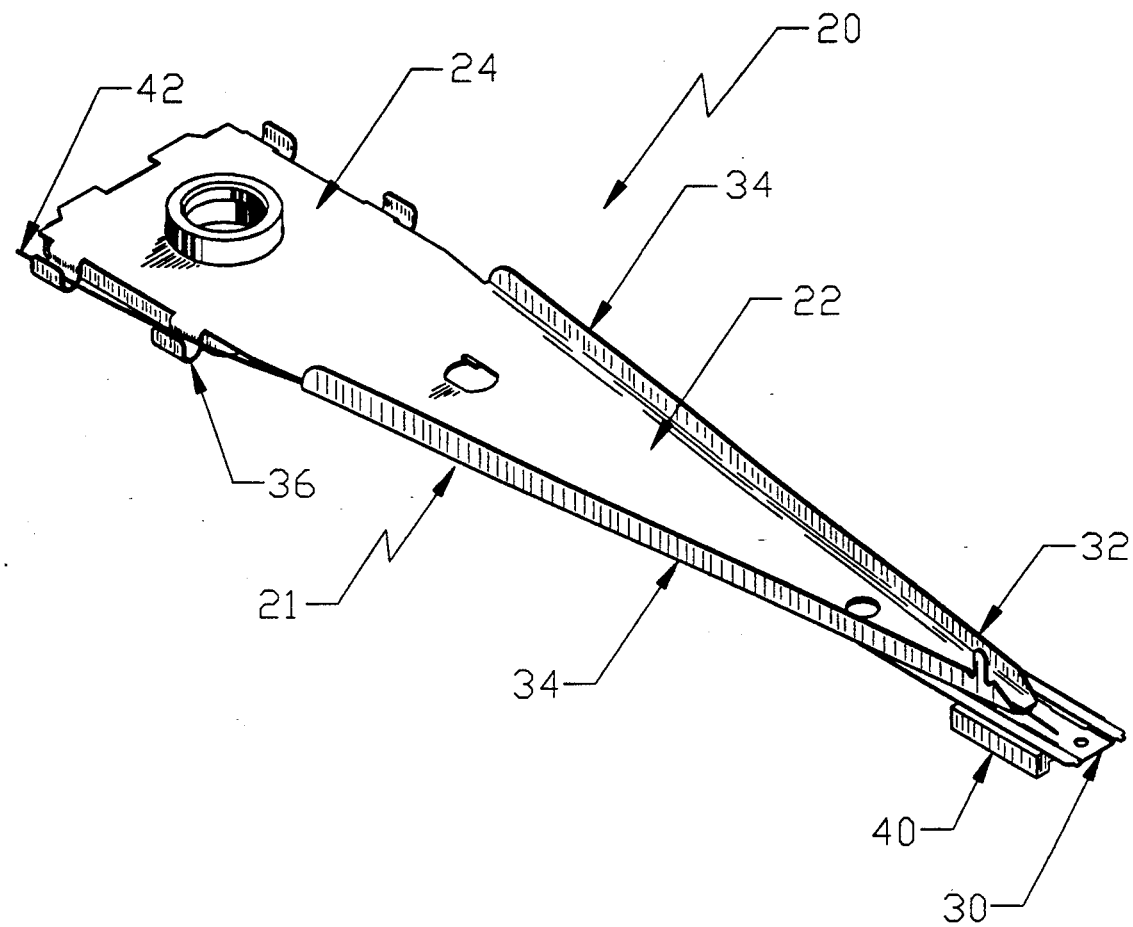
FIG. 4 is a perspective view of a gimbal assembly, the load of which can be adjusted by the load adjusting machine.

A regram machine 10 in accordance with the present invention is illustrated generally in FIGS. 1-3. Regram machine 10 is a computer-controlled machine which uses both mechanical and thermal energy to adjust the loads on magnetic disk drive head gimbal assemblies after the assemblies have been assembled from their component parts. Regram machine 10 can also be used to adjust the loads or suspension assemblies before they are assembled into the head gimbal assemblies. Regram machine 10 and the algorithm it executes can quickly and accurately adjust head gimbal assembly and suspension assembly gram loads. The description of regram machine 10 will be facilitated by the following brief description of a head gimbal assembly such as that shown at 20 in FIG. 4.

Head gimbal assemblies such as 20 include an air bearing head slider assembly 40 mounted to a suspension assembly 21. Suspension assembly 21 includes an elongated, triangularly shaped load beam 22 with a baseplate 24 and apex 32. Load beam baseplate 24 is configured to be rigidly mounted to a disk drive positioning arm (not shown). A T-flexure member or gimbal 30 is positioned at the apex 32 of the load beam 22. Load beams 22 are typically manufactured by chemically etching a thin sheet of stainless steel, and mechanically forming flanges 34 and lead clamps 36 on the edges of the blank. Gimbal 30 is also etched from stainless steel. In the embodiment shown in FIG. 4, gimbal 30 is formed as a separate member which is subsequently mounted to load beam 22 by spot welds. In other embodiments (not shown), gimbal 30 is formed integrally from the apex of load beam 22. The air bearing head slider assembly 40 includes a magnetic head (not visible in FIG. 4), and is mounted to gimbal 30. Leads 42 from the magnetic head are secured to load beam 22 by bending lead clamps 36 over the leads.

High performance disk drive operation requires air bearing head slider assembly 40 to closely follow the moving magnetic disk surface at a constant spacing and attitude. To meet this critical requirement, the gram loading force applied to slider assembly 40 by load beam 22 must be within a well defined, and relatively small, specification window. In one disk drive, for example, the specification window is 7.50-7.90 grams, with 7.70 grams being nominal. Although the gram load of load beam 22 is initially set following its manufacture, the load is sometimes forced out of the specification window when gimbal 30, slider assembly 40 and/or leads 42 are mounted thereto. Regram machine 10 can therefore be used to adjust the load of suspension assembly 21 after it has been fabricated, and used to re-adjust the load of head gimbal assemblies 20 following their assembly.

Referring back to FIGS. 1-3, regram machine 10 is shown to include gimbal assembly indexing and clamp mechanism 50, elevator/backbend mechanism 52, infrared source 54 and load cell assembly 56, all of which are coupled to and controlled by computer 58. Gimbal assemblies such as 20 to be regrammed are first moved or indexed to regram station 60 and clamped to datum 62 by indexing and clamp mechanism 50. Elevator/backbend mechanism 52 and load cell assembly 56 are then actuated to make a measurement of the initial gram load of the gimbal assembly. If the gram load is within the window specification, indexing and clamp mechanism 50 unclamps and removes the gimbal assembly from datum 62 while simultaneously indexing and clamping the next gimbal assembly to the datum. If the gram load of the gimbal assembly is out of the specification window, computer 58 actuates elevator/backbend mechanism 52 and/or infrared source 54 in accordance with an algorithm described below to bring the measured gram load within the specification window. Infrared source 54 provides the thermal energy needed to lower or "downgram" gimbal assembly loads during light adjust procedures capable of accurately lowering loads over a relatively narrow range. Elevator/backbend mechanism 52 is used to mechanically adjust or bend gimbal assembly loads over larger load excursions and into the range that can be accommodated by the light adjust procedure. After the light adjust and/or mechanical adjust procedures have been executed and the measured gimbal assembly load is within the specification window, indexing and clamp mechanism 50 is again actuated to remove the regrammed gimbal assembly so these procedures can be repeated on subsequent gimbal assemblies.

Indexing and clamp mechanism 50 includes a right angle gearbox 64 with a pair of vacuum heads 65 extending from its opposite ends. Gearbox 64 is supported and guided for movement about a vertical path by linear bearing block 66 and shafts 67. Pneumatic lift cylinder 68 is actuated to raise and lower the gearbox 64. Gearbox 64 is also mounted for rotation by rotation drive 70. Rotation drive 70 includes a pneumatic cylinder 72 having its rod 74 connected to a rotation rack 76 by coupler 78. Rotation rack 76 engages a pinion 80 which is mounted to right angle gearbox 64. The motion of rack 76 is guided by bearing 82. Clamp datum 62 is supported by gusset 84.

Gimbal assemblies to be regrammed are positioned on the upper surface of vacuum heads 65 when the vacuum heads are located at load station 86. Vacuum heads 65 are coupled to a vacuum source (not shown) and each include an internal chamber and a number of holes (not visible) extending through the head. Guides 87 on the exterior of vacuum heads 65 properly align the gimbal assemblies with the holes enabling the vacuum to hold the gimbal assemblies to the heads as gearbox 64 is rotated. During the indexing and clamping operation performed by mechanism 50, computer 58 actuates lift cylinder 68 to raise gearbox 64 and provide the necessary clearance between vacuum heads 65 and clamp datum 62. Computer 58 also actuates rotation drive 70 to rotate gearbox 64, thereby driving vacuum heads 65 between load station 86 and regram station 60. As it is being rotated, gearbox 64 rotates vacuum heads 65 so the gimbal assembly positioned on top of the vacuum head at load station 86 is moved to a position between the head and clamp datum at regram station 60, and the regrammed gimbal assembly from station 60 is on top of the head after being moved to the load station. Lift cylinder 68 is then lowered to clamp the gimbal assembly to be regrammed between vacuum head 65 and clamp datum 62. The most recently regrammed gimbal assembly can then be removed from the vacuum head 65 at the load station 86, and the next gimbal assembly positioned thereon.

Elevator/backbend mechanism 52 includes a bearing block 90 mounted to gusset 84 by means of linear slide 85 for reciprocating vertical movement, and a stepper motor 92 which drives the bearing block through pinion 94 and rack 96. Motor 92 is coupled to and controlled by computer 58. Upper and lower fingers 97 and 98 extend horizontally from the upper end of bearing block 90 toward clamp datum 62. While gearbox 64 is being rotated to transfer gimbal assemblies between load station 86 and regram station 60, computer 58 positions bearing block 90 in a neutral position at which upper finger 97 is positioned above, and lower finger 98 below, the upper surface of clamp datum 62 (i.e., the position shown in FIG. 1). The load beams of gimbal assemblies clamped at regram station 60 therefore extend into the gap between fingers 97 and 98, and pass through the gap as they are transferred between the regram station and load station 86.

Load cell assembly 56 includes a load cell micrometer slide 100 mounted to base 102 by slide bearing 104 for reciprocating horizontal movement. A mounting block 106 which extends from micrometer slide 100 supports the load cell 108. As shown, the load cell cap 110 (the measurement arm) extends from the upper surface of load cell 108 on the end of the load cell adjacent regram station 60. The height of load cell 108 with respect to clamp datum 62 can be adjusted by micrometer 112 so regram machine 10 can be used with gimbal assemblies having load beams which extend to different heights when clamped to datum 62.

Pneumatic load cell cylinder 114 has a rod 116 coupled to slide plate 100. When actuated by computer 58, cylinder 114 drives slide plate 100, and therefore load cell 108 mounted thereto, between a measurement position and a retracted position. In the measurement position load cell 108 is close enough to clamp datum 62 that the load beam of the gimbal assembly clamped to the datum can engage load cell cap 110. In the retracted position the load cell 108 is withdrawn from clamp datum 62 to such an extent that gimbal assemblies can be moved to and withdrawn from regram station 60 without interference from the load cell. Shock absorbers 118 and 120 are included to cushion the motion of slide plate 100 as it is driven to its measurement and retracted positions.

Computer 58 coordinates the actuation of load cell assembly 56 and elevator/backbend mechanism 52 during gram load measurements. With load cell 108 in its retracted position, elevator/backbend bearing block 90 is driven upwardly, forcing finger 98 to engage the gimbal assembly load beam and bend the load beam upwardly within its range of elastic flexion (i.e., no permanent deformation). The load beam is raised enough to provide sufficient clearance for load cell 108 to be driven to its measurement position below the gimbal assembly. Elevator/backbend mechanism 52 is subsequently driven downwardly to engage the gimbal assembly load beam with load cell cap 110 so gram load measurements can be provided by load cell 108. After the gram load has been determined, elevator/backbend mechanism 52 is actuated in an identical manner to lift the gimbal assembly load beam off load cell cap 110 to provide the clearance needed to drive load cell 108 to its retracted position.

As mentioned above, regram machine 10 executes both mechanical adjust and light adjust procedures to regram gimbal assemblies. The mechanical adjust procedure can be used to both increase or "upgram" the gram loads of gimbal assemblies, and to decrease or "downgram" the gram loads. Upgram mechanical adjust procedures are performed by actuating elevator/backbend bearing block 90 to move finger 97 downwardly into engagement with the gimbal assembly load beam near the load beam base, and bending the load beam downwardly within its plastic range of flexion (i.e., "permanent" deformation) to increase the gram load exerted by the load beam on the slider assembly. Similarly, downgram mechanical adjust procedures are performed by actuating elevator/backbend bearing 90 to move finger 98 upwardly into engagement with the gimbal assembly load beam, and bending the load beam upwardly within its plastic range of flexion to decrease the gram load.

Figure 7:
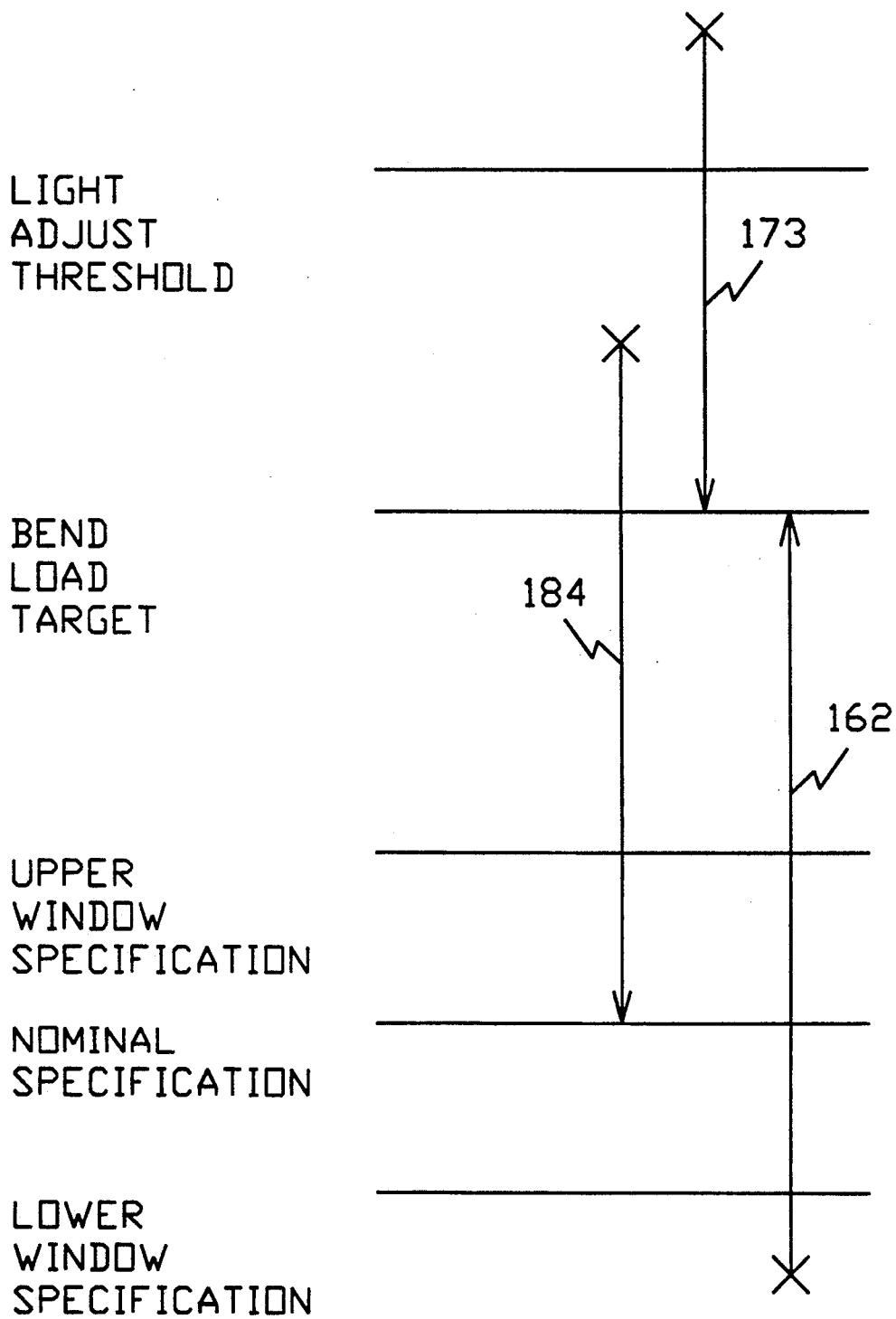
FIG. 7 is a graphic representation of gimbal assembly load changes made by the load adjusting machine while implementing the algorithm illustrated in FIG. 6.

Throughout the following description of regram machine 10, the term Nominal Specification refers to the desired gram load of the gimbal assembly following its manufacture. However, gram loads within a predetermined range defined as the Specification Window surrounding the Nominal Specification are acceptable. The upper limit of the Specification Window is a gram load defined as the Upper Window Specification, while the lower limit is defined as the Lower Window Specification. For reasons discussed below, the target of all upgram and downgram mechanical adjust procedures implemented by regram machine 10 is a load characterized as the Bend Load Target. The Bend Load Target is a load greater than the Upper Window Specification. For reasons also discussed below, regram machine 10 performs light adjust procedures only if the gram load is within a predetermined range above the Upper Window Specification. The upper limit of this range is a load value characterized as the Light Adjust Threshold. FIG. 7 is an illustration of the relationship between the Nominal Specification, Upper and Lower Window Specifications, Bend Load Target and Light Adjust Threshold. Data representative of these values is stored in memory (not separately shown) of computer 58. In one embodiment the Light Adjust Threshold is specified in the memory as a threshold variable characteristic of a range above the Bend Load Target. The Light Adjust Threshold is computed by summing the Bend Load Target and threshold variable.

To facilitate the mechanical adjust procedures, computer 58 includes memory for storing both upgram mechanical adjust data and downgram mechanical adjust data characterizing the relationship between amounts of load beam bending and associated gram load increases and decreases, respectively. In one embodiment the mechanical adjust data is data describing simple linear regression lines characterizing gram load increases and decreases (i.e, $\Delta g$) as a function of the direction and number of steps elevator/backbend motor 92 is to be driven. After a load measurement is taken and the desired change in load determined, the upgram or downgram adjust data is accessed as a function of the desired load change to determine the number of steps motor 92 should be driven to induce the change. Computer 58 uses this information to generate the appropriate control signals for motor 92. The data used to generate the regression lines is empirically determined. Furthermore, computer 58 can continually update the upgram and downgram mechanical adjust data on the basis of comparisons between the actual load changes induced by the mechanical adjust procedures (based on load measurements made after the procedures) and the expected load changes. In one embodiment, measured data from the ten most recently executed mechanical adjust procedures is used to recompute the regression line prior to the execution of the next such procedure.

Figure 5:
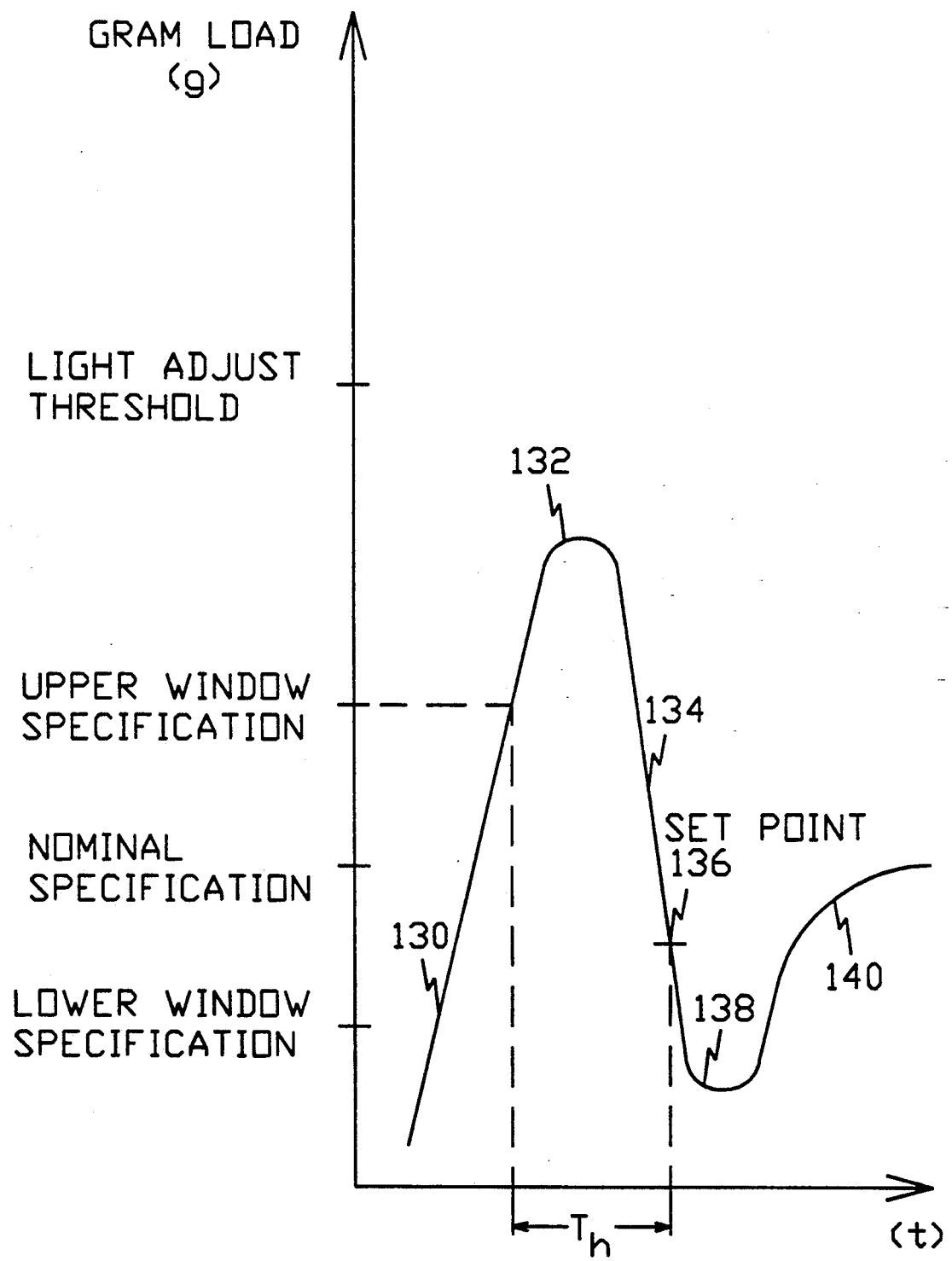
FIG. 5 is a graphical representation of gimbal assembly load changes as a function of time during light adjust procedures performed by the load adjusting machine.

FIG. 5 is a graphic representation of gram load changes occurring during light adjust procedures implemented by regram machine 10. The light adjust procedures make use of the knowledge that the force exerted by stainless steel members such as the gimbal assembly load beams can be reduced through exposure to thermal energy. The light adjust procedures are therefore only used to downgram load beam gram loads. Furthermore, the range of loads over which load beams can be accurately downgrammed by light adjust procedures is limited by browning and other discoloration of the gimbal assembly that can be caused by extended exposure to the thermal energy. Light adjust procedures are therefore only used if the loads of the gimbal assemblies to be regrammed are within a predetermined range of the Nominal Specification. The Light Adjust Threshold refers to the upper limit of the range of loads over which the light adjust procedure will be used to downgram gimbal assembly loads.

Light adjust procedures are performed while the gimbal assembly loads are being monitored by load cell 108. As the gimbal assembly load beam is being engaged with load cell cap 110 during the measurement procedure described above, the measured gram load quickly slews (i.e., rises) toward its current actual value. This event is graphically represented by line segment 130 in FIG. 5. When the measured gram load reaches the Upper Window Specification, computer 58 actuates infrared source 54, thereby applying heat to the gimbal assembly load beam. Since the applied heat reduces the gram load of the load beam, the measured gram load quickly peaks at a value above the Upper Window Specification, but below what would have been the actual load had infrared source 54 not been turned on. This event is graphically represented by line segment 132 in FIG. 5. Continued application of heat causes the measured gram load to decrease with time as represented by line segment 134. Computer 58 monitors the decreasing load, and following the programmed light adjust procedure, deactuates infrared source 54 when the measured gram load has decreased to a predetermined and stored Set Point 136, typically a gram load between the Nominal Specification and the Lower Window Specification. Once source 54 has been turned off, the measured gram load decrease quickly slows with the dissipation of heat, and the gram load reaches its minimum value (typically a load below the Lower Window Specification). This event is represented by line segment 138. With continued cooling of the gimbal assembly load beam, the gram load will increase somewhat, and stabilize at an equilibrium or final value that is preferably well within the Specification Window, and ideally close to the Nominal Specification. This event is represented by line segment 140. The period of time that the gimbal assembly load beam is heated is shown as $T_h$ in FIG. 5. Computer 58 includes stored data characterizing the length of the period of time required for the gimbal assembly load to reach its equilibrium value following a light adjust procedure, and initiates a measurement of the final gram load after that period has elapsed. Computer 58 continually updates the Set Point on the basis of comparisons between the final gram loads and the Nominal Specification in an attempt to minimize the differences between these values during light adjust procedures.

The initial Set Point is calculated by computer 58 as a function of the Nominal Specification and the Specification Window. In one embodiment, the initial Set Point is set to a value equal to the Nominal Specification less twenty percent of the Specification Window, i.e., initial Set Point=Nominal Specification—0./2 (Upper Window Specification—Lower Window Specification).

The initial Set Point is used during the first light-adjust procedure performed by regram machine 10 in the manner described below. After the first light-adjust procedure is performed, the resulting gimbal assembly gram load is measured and compared to the Nominal Specification. If the measured gram load was above or below the Nominal Specification, the Set Point for the second and third light-adjust procedures are decreased or increased, respectively, by forty percent of the difference between the measured gram load following the first light-adjust procedure and the Nominal Specification, i.e., Set Point$_{2,3}$=initial Set Point±0.4|(measured gram load—Nominal Specification)|. The Set Point calculated in this manner is used during the second and third light-adjust procedures performed by regram machine 10.

The fourth and fifth light-adjust procedures are performed using a Set Point calculated as a function of the Set Point used during the light-adjust procedure for the second and third such procedures, and an average of the measured gimbal assembly gram loads following the first three light adjust procedures, i.e., measured loads 1-3. In one embodiment, the Set Point used for the fourth and fifth light-adjust procedures (Set Points$_{4,5}$) are computed using the following formula: Set Points$_{4,5}$ = Set Point$_3 \pm 0.4 | [(\Sigma$measured loads$_{1-3})/3 -$ Norminal Specifications$]|$.

The fourth and fifth light-adjust procedures are then implemented using the Set Point calculated in the manner described above, and the resulting gimbal assembly gram loads measured. The sixth and seventh light-adjust procedures are performed with a Set Point calculated in a manner similar to that described above, but on the basis of an average of the measured gram loads following the first five light-adjust procedures. In one embodiment, the Set Point is thereafter updated in this manner after every two light-adjust procedures, using the average of the measured gram loads following the five most recently performed light-adjust procedures.

Figure 6A:
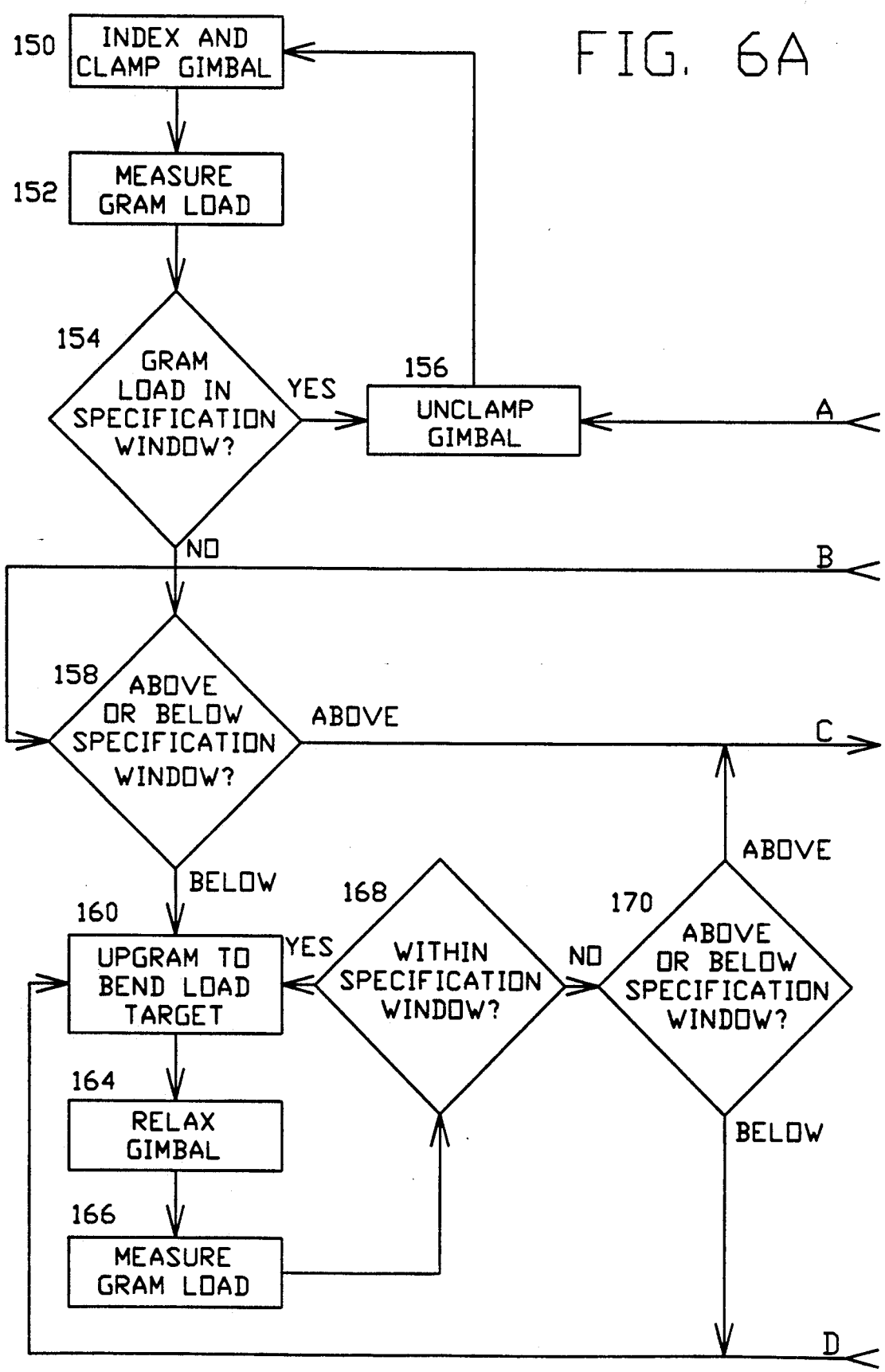
FIG. 6A and B are flow diagram illustrating the load adjusting algorithm implemented by the load adjusting machine.

The operation of regram machine 10 can be described with reference to FIGS. 6 and 7. FIG. 6 is a diagrammatic representation of the regram algorithm executed by computer 58, while FIG. 7 a graphic representation of the gimbal assembly gram load changes made by regram machine 10 in the course of executing the algorithm. As shown at step 150, computer 58 initiates a regram procedure by indexing a gimbal assembly to regram station 60 and clamping the assembly to datum 62. The initial gram load of the gimbal assembly is then measured and compared to the Specification Window as indicated by steps 152 and 154. If the gimbal assembly load is still within the Specification Window following its assembly, it is immediately unclamped from datum 62 and returned to the load position as shown by step 156.

If the initial gram load is determined to be out of the Specification Window and below (less than) the Lower Window Specification, computer 58 initiates a mechanical adjust procedure described above in an attempt to upgram the gimbal assembly load to the Bend Load Target. These steps are shown at 158 and 160 in FIG. 6, and the resulting load change graphically illustrated by line 162 in FIG. 7. The Bend Load Target is a gram load value selected as an optimum load from which to subsequently initiate a light adjust procedure, i.e., a starting gram load from which the light adjust procedure can most accurately downgram the load to the Nominal Specification.

After the gimbal assembly load has been mechanically upgrammed, computer 58 disengages elevator/backbend bearing block 90 for a short but sufficient period of time (e.g., 10 msec) for the gimbal assembly load beam to relax, and its gram load to stabilize. This step is shown at 164 in FIG. 6. The gram load is then measured as shown by step 166.

Since light adjust procedures provide more stable long term gram loads than mechanical adjust procedures, the regram algorithm implemented by computer 58 ensures that the final gimbal assembly load change is performed through a light adjust procedure. Accordingly, the measured gram load is compared to the Specification Window following upgram mechanical adjust procedures performed at step 160. As indicated by step 168, if the upgram mechanical adjust procedure was unsuccessful and the measured gram load is within the Specification Window, mechanical upgram step 160 is repeated. For similar reasons, and as indicated by step 170, mechanical upgram step 160 is also repeated if the previous such step failed to increase the gram load to the Specification Window. Although not shown in FIG. 6, in one embodiment of regram machine 10, the regram algorithm will execute up to only two mechanical upgram steps 160. If after two mechanical upgram steps 160 the measured gram load is still within or below the Window Specification, the gimbal assembly is unclamped and rotated out of the regram station.

If the measured gimbal assembly gram load is found to be above the Specification Window during steps 158 or 170, the gram load is compared to the Light Adjust Threshold as indicated by step 172. If the gimbal assembly gram load is determined to be above the Light Adjust Threshold during this comparison, computer 58 implements a downgram mechanical adjust procedure in an attempt to lower the gram load to the Bend Load Target. This load change is graphically illustrated by line 173 in FIG. 7. The gimbal assembly is then relaxed, and the gram load measured. These operations are indicated by steps 174, 176 and 178.

If the measured gram load following mechanical downgram step 174 is within the Specification Window, the algorithm returns to mechanical upgram step 160 since a light adjust procedure must be performed to bring the gram load to within the Specification Window. If the measured gram load is not within the Specification Window, the algorithm returns to step 158 to determine whether the load is above or below the window and take appropriate action. These operations are indicated by step 180.

The gimbal assembly gram load is within the appropriate range for a downgram light adjust procedure if during comparison step 172 the measured gimbal assembly gram load is found to be less than or equal to the Light Adjust Threshold. As indicated by step 182, a light adjust procedure is therefore implemented in an attempt to lower the gram load to the Nominal Specification. This gram load change is graphically illustrated by line 184 in FIG. 7. The gimbal assembly is then relaxed and the actual gram load measured as shown by steps 186 and 188. A successful light adjust procedure (i.e., if the measured gram load is within the Window Specification) completes the gimbal assembly regram procedure. The gimbal assembly can therefore be unclamped and rotated out of the regram station as shown by step 190.

If the light adjust procedure performed at step 182 was unsuccessful, the measured gram load is compared to the Specification Window as shown by step 192. If this comparison indicates that the light adjust procedure failed to lower the gram load to the Window Specification, the Set Point value stored in memory and used by computer 58 during the light adjust procedure is lowered by a predetermined amount (step 194). The light adjust procedure and subsequent Steps 182, 186, 188 190 and 192 are then repeated. However, if following a light adjust procedure the measured gram load is below the Specification Window, the algorithm returns to step 160 to perform an upgram mechanical adjust procedure and subsequent operations.

Although not shown in FIG. 6, in one embodiment of regram machine 10, the regram algorithm will execute up to only two light adjust steps 182. If after two light adjust steps 182 the measured gram load is still not within the Specification Window, the gimbal assembly is unclamped and rotated out of the regram station.

The regram algorithm described above efficiently and accurately readjusts the gram loads of out-of-specification gimbal assemblies and suspension assemblies. These gram load changes are also quickly performed by the pneumatically actuated components of the regram machine. One prototype of the regram machine can regram between 3 and 5 gimbal assemblies per minute.

Although the present invention has been described with reference to preferred embodiments, those skilled in the art will recognize that changes may be made in form and detail without departing from the spirit and scope of the invention.

What is claimed is:

1. A machine for adjusting loads on magnetic disk drive head suspension assemblies to bring the loads within a desired specification window defined by upper and lower window specifications, including:
   a load cell for measuring and providing load signals representative of actual suspension assembly loads;
   a mechanical bending mechanism responsive to mechanical adjust control signals for bending suspension assemblies to increase and decrease suspension assembly loads;
   a heat source responsive to heat adjust control signals for applying heat to suspension assemblies to decrease suspension assembly loads;
   memory for storing:
      mechanical adjust data representative of the relationship between mechanical adjust control signals and load changes induced by the mechanical bending mechanism;
      heat adjust data representative of the relationship between heat adjust control signals and load decreases induced by the heat source; and
      control data representative of the upper and lower window specifications and a light adjust threshold, wherein the light adjust threshold is a load greater than the upper window specification; and
   a digital processor coupled to the load cell, mechanical bending mechanism, heat source and memory, and including means for:
      (a) receiving load signals representative of suspension assembly loads measured by the load cell;
      (b) accessing the memory and generating mechanical adjust control signals as a function of the load signals, to actuate the mechanical bending mechanism and attempt to increase suspension assembly loads to loads greater than the upper window specification if the measured loads are less than the lower window specification;
      (c) accessing the memory and generating mechanical adjust control signals as a function of the load signals, to actuate the mechanical bending mechanism and attempt to decrease suspension assembly loads to loads less than or equal to the light adjust threshold and greater than the upper window specification if the measured loads are greater than the light adjust threshold;
      (d) accessing the memory and generating heat adjust control signals as a function of the load signals, to actuate the heat source and attempt to decrease suspension assembly loads to loads less than or equal to the upper window specification and greater than or equal to the lower window specification if the measured loads are greater than the upper window specification and less than or equal to the light adjust threshold; and
      (e) repeating functions (a)–(d) a predetermined number of times, or until the measured suspension assembly loads are within the specification window.

2. The load adjusting machine of claim 1 wherein the digital processor means for function (b) further includes means for accessing the memory and generating mechanical adjust control signals as a function of the load signals, to actuate the mechanical bending mechanism and attempt to increase suspension assembly loads to loads greater than the upper window specification and less than or equal to the light adjust threshold if the measured loads are less than the lower window specification.

3. The load adjusting machine of claim 2 wherein:
   the memory for storing control data further includes memory for storing data representative of a bend load target, wherein the bend load target is a load greater than the upper window specification and less than the light adjust threshold; and
   the digital processor means for function (b) includes means for accessing the memory and generating mechanical adjust control signals as a function of the load signals, to actuate the mechanical bending mechanism and attempt to increase suspension assembly loads to loads equal to the bend load target if the measured loads are less than the lower window specification; and
   the digital processor means for function (c) includes means for accessing the memory and generating mechanical adjust control signals as a function of the load signals, to actuate the mechanical bending mechanism and attempt to decrease suspension assembly loads to loads equal to the bend load target if the measured loads are greater than the light adjust threshold.

4. The load adjusting machine of claim 3 wherein the digital processor means further includes means for:
   (f) accessing the memory and generating mechanical adjust control signals as a function of the load signals, to actuate the mechanical bending mechanism and attempt to increase suspension assembly loads to loads equal to the bend load target if the measured loads are within the specification window after the digital processor means for functions (b) or (c) are actuated; and
   (g) repeating functions (a) (d) and (f) but not (e), a predetermined number of times, or until the measured suspension assembly loads are within the specification window.

5. The load adjusting machine of claim 4 wherein:
   the memory for storing control data representative of the light adjust threshold includes memory for storing a threshold variable; and
   the digital processor means for functions (c) and (d) determines the light adjust threshold as a function of a sum of the bend load target and the threshold variable.

6. The load adjusting machine of claim wherein the processor means further includes means for: (f) relaxing the suspension assemblies after the digital processor means for functions (b)–(d) are actuated.

7. The load adjusting machine of claim 1 wherein:
   the memory for storing the heat adjust data includes memory for storing data representative of a set point load; and
   the digital processor means for function d) includes means for:
      (d$_1$) receiving load signals representative of measured suspension assembly loads;

($d_2$) monitoring increasing suspension assembly loads as the suspension assemblies are engaged with the load cell;

($d_3$) actuating the heat source when the measured suspension assembly loads reach the upper window specification; and ($d_4$) deactuating the heat source when the measured suspension assembly loads have decreased to the set point load.

8. The load adjusting machine of claim 7 wherein the processor means further includes means for:

(f) accessing the memory and lowering the set point load if the measured load is greater than the upper window specification after the digital processor means for function (d) is actuated; and (g) repeating functions (a)–(d) and (f), but not (e) a predetermined number of times, or until the measured suspension assembly loads are within the specification window.

9. The load adjusting machine of claim 1 wherein:

the mechanical bending mechanism includes a stepper motor-actuated bending member;

the memory for storing the mechanical adjust data includes memory for storing the data representative of load changes as a function of motor steps; and the processor means for functions (b) and (c) include means for accessing the memory as a function of the desired load changes and for generating the mechanical adjust control signals as a function of the associated number of motor steps.

10. The load adjusting machine of claim 1 wherein:

the memory for storing control data includes memory for storing control data representative of a nominal specification; and the processor means for function (d) including means for accessing the memory and generating heat adjust control signal as a function of the load signals, to actuate the heat source and attempt to decrease the suspension assembly loads to the nominal specification if the measured loads are greater than the upper window specification and less than or equal to the light adjust threshold.

11. A regram machine using mechanical adjust procedures and light adjust procedures to adjust gram loads on magnetic disk drive head suspension assemblies, including:

a regram station including a datum at which suspension assembly loads are adjusted;

a load station at which suspension assemblies are loaded onto the regram machine;

an indexing and clamping mechanism for transferring suspension assemblies between the load station and the regram station, and for clamping the suspension assemblies to the datum;

an elevator/backbend mechanism for engaging and bending suspension assemblies clamped to the datum;

a heat source for applying heat to suspension assemblies clamped to the datum;

a load cell for measuring actual suspension assembly loads;

a load cell assembly for driving the load cell between a measurement position at which the loads of suspension assemblies at the regram station can be measured during measurement procedures and light adjust procedures, and a retracted position enabling suspension assemblies to be engaged by the elevator/backbend mechanism during measurement procedures and mechanical adjust procedures;

program memory for storing:

measurement procedure control data characterizing the operation of the elevator/backbend mechanism and the load cell assembly during suspension assembly load measurement procedures;

mechanical adjust procedure control data characterizing the operation of the elevator/backbend mechanism to increase and decrease suspension assembly loads during upgram and downgram mechanical adjust procedures;

light adjust procedure control data characterizing the operation of the heat source and the load cell assembly during downgram light adjust procedures; and load data representative of a nominal load, upper and lower window specifications characteristic of a specification window, a bend load target characteristic of a desired load from which to implement light adjust procedures, and a light adjust threshold characteristic of an upper limit of load changes implemented by light adjust procedures; and a digital processor coupled to the indexing and clamping mechanism, elevator/backbend mechanism, heat source, load cell, load cell assembly and memory, and including means for:

(a) actuating the indexing and clamping mechanism to clamp a suspension assembly to the datum;

(b) executing a measurement procedure to measure the suspension assembly load;

(c) executing an upgram mechanical adjust procedure in an attempt to increase the suspension assembly load to the bend load target if the measured load is less than the lower window specification;

(d) executing a downgram mechanical adjust procedure in an attempt to decrease the suspension assembly load to the bend load target if the measured load is greater than the light adjust threshold;

(e) executing a light adjust procedure in an attempt to decrease the suspension assembly load to the nominal specification if the measured load is greater than the upper window specification and less than or equal to the light adjust threshold; and (f) repeating functions (b)–(e) a predetermined number of times, or until the measured suspension assembly load is within the specification window.

12. The regram machine of claim 11 wherein the digital processor further includes means for:

(g) executing a mechanical adjust procedure in an attempt to increase the suspension assembly load to the bend load target if the measured load is within the specification window after the digital processor means for functions (c) or (d) are initiated; and (h) repeating functions (a)–(e) and (g), but not (f) a predetermined number of times, or until the measured suspension assembly load is within the specification window.

13. The regram machine of claim 11 wherein the processor means for function (b) include means for:

($b_1$) actuating the elevator/backbend mechanism to engage and bend the suspension assembly within its elastic range of flexion;

($b_2$) actuating the load cell assembly to drive the load cell to the measurement position below the suspension assembly; actuating the elevator/backbend mechanism to lower the suspension assembly onto the load cell;

(b₃) reading the measured load from the load cell;

(b₄) actuating the elevator/backbend mechanism to engage and bend the suspension assembly within its elastic range of flexion after the load is measured;

(b₆) actuating the load cell assembly to drive the load cell to the retracted position; and (b₇) actuating the elevator/backbend mechanism to release the suspension assembly.

14. The regram machine of claim 11 wherein:

the program memory for storing the mechanical adjust procedure control data includes memory for storing data representative of the relationship between the extent of downward suspension assembly bending by the elevator/backbend mechanism and load changes induced by the bending; and the processor means for function (c) include means for:

(c₁) computing a required load change to increase the suspension assembly load from the measured load to the bend load target;

(c₂) accessing the program memory as a function of the required load change to determine a required extent of suspension assembly bending; and (c₃) actuating the elevator/backbend mechanism to bend the suspension assembly the required extent in an attempt to increase the suspension assembly load to the bend load target.

15. The regram machine of claim 11 wherein:

for storing the mechanical adjust procedure control data includes memory for storing data representative of the relationship between the extent of upward suspension assembly bending by the elevator/backbend mechanism and load changes induced by the bending; and the processor means for function (d) include means for:

(d₁) computing a required load change to decrease the suspension assembly load from the measured load to the bend load target;

(d₂) accessing the program memory as a function of the required load change to determine a required extent of suspension assembly bending; and (d₃) actuating the elevator/backbend mechanism to bend the suspension assembly the required extent in an attempt to decrease the suspension assembly load to the bend load target.

16. The regram machine of claim 15 wherein:

the program memory for storing the light adjust procedure control data includes memory for storing data representative of a set point load;

the processor means for function (e₁) includes means for accessing the memory to determine the set point load: and the processor means for function (e₂) includes means for:

(e₂ᵢ) measuring suspension assembly loads;

(e₂ᵢᵢ) monitoring increasing suspension assembly loads as the suspension assemblies are engaged with the load cell;

(e₂ᵢᵢᵢ) actuating the heat source when the measured suspension assembly loads reach the upper window specification; and (e₂ᵢᵥ) deactuating the heat source when the measured suspension assembly loads have decreased to the set point load.

17. The regram machine of claim 11 wherein:

the program memory for storing the light adjust procedure control data includes memory for storing data representative of the relationship between the extent of heat applied to the suspension assembly by the heat source and the load decreases induced by the heat; and the processor means for function (e) include means for:

(e₁) accessing the program memory to determine the extent of heat to be applied; and (e₂) actuating the heat source to apply heat to the required extent in an attempt to decrease the suspension assembly load to the nominal specification.

18. A method for using mechanical adjust procedures and light adjust procedures to adjust a gram load on a magnetic disk drive head suspension assembly on the basis of comparisons of measured gram loads with respect to a nominal load, upper and lower window specifications characteristic of a specification window, and a light adjust threshold characteristic of an upper limit of load changes that can be implemented by the light adjust procedures, including:

(a) performing an upgram mechanical adjust procedure in an attempt to increase the suspension assembly load to a load greater than the upper window specification if the measured load is less than the lower window specification;

(b) performing a downgram mechanical adjust procedure in an attempt to decrease the suspension assembly load to a load less than or equal to the light adjust threshold and greater than the upper window specification if the measured load is greater than the light adjust threshold;

(c) performing a light adjust procedure in an attempt to decrease the suspension assembly load to a load less than or equal to the upper window specification and greater than or equal to the lower window specification if the measured load is less than or equal to the light adjust threshold and greater than the upper window specification; and (d) repeating steps (a)-(c) a predetermined number of times, or until the measured suspension assembly load is within the specification window.

19. The method of claim 18, wherein step (a) further includes performing an upgram mechanical adjust procedure in an attempt to increase the suspension assembly load to a load greater than the upper window specification and less than or equal to the light adjust threshold if the measured load is less than the lower window specification.

20. The method of claim 19, wherein the gram load adjustment is also performed on the basis of comparisons between the measured gram loads and a bend load target characteristic of a desired load from which to implement the light adjust procedures, and wherein:

step (a) further includes performing and upgram mechanical adjust procedure in an attempt to increase the suspension assembly load to the bend load target if the measured load is less than the lower window specification; and step (b) further includes performing a downgram mechanical adjust procedure in an attempt to decrease the suspension assembly load to the bend load target of the measured load is greater than the light adjust threshold.

21. The method of claim 20 and further including:

(e) performing an upgram mechanical adjust procedure in an attempt to increase the suspension assembly load to the bend load target if the measured load is less than or equal to the upper window specification after step (c) is performed; and (f) repeating steps (a)-(c) and (e), but not (d), a predetermined number of times, or until the measured suspension assembly load is within the specification window.

* * * * *

UNITED STATES PATENT AND TRADEMARK OFFICE
CERTIFICATE OF CORRECTION

PATENT NO. : 5,297,413

DATED : March 29, 1994

INVENTOR(S) : Thomas A. Schones et al.

It is certified that error appears in the above-identified patent and that said Letters Patent is hereby corrected as shown below:

Column 14, line 57, after "claim" insert --1--.

Column 15, line 36, delete "including" and insert --includes--.

Column 17, line 1, after "assembly;" insert --$(b_3)$--.

Column 17, line 4, delete "$(b_3)$" and insert --$(b_4)$--.

Column 17, line 5, delete "$(b_4)$" and insert --$(b_5)$--.

Column 17, line 32, before "for" insert --the program memory--.

Signed and Sealed this

Ninth Day of August, 1994

Attest:

BRUCE LEHMAN

*Attesting Officer*    *Commissioner of Patents and Trademarks*